(12) United States Patent
Scharf et al.

(10) Patent No.: US 10,229,775 B2
(45) Date of Patent: Mar. 12, 2019

(54) MAGNETOCALORIC CASCADE AND METHOD FOR FABRICATING A MAGNETOCALORIC CASCADE

(71) Applicant: BASF SE, Ludwigshafen (DE)

(72) Inventors: Florian Scharf, Frankfurt (DE); Markus Schwind, Madison, WI (US); David Van Asten, Utrecht (NL); Steven Alan Jacobs, Madison, WI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/535,621

(22) PCT Filed: Dec. 7, 2015

(86) PCT No.: PCT/EP2015/078848
§ 371 (c)(1),
(2) Date: Jun. 13, 2017

(87) PCT Pub. No.: WO2016/096509
PCT Pub. Date: Jun. 23, 2016

(65) Prior Publication Data
US 2018/0005735 A1 Jan. 4, 2018

Related U.S. Application Data

(60) Provisional application No. 62/093,554, filed on Dec. 18, 2014.

(51) Int. Cl.
*F25B 21/00* (2006.01)
*H01F 1/01* (2006.01)
(52) U.S. Cl.
CPC ............. *H01F 1/012* (2013.01); *F25B 21/00* (2013.01)

(58) Field of Classification Search
CPC ....... F25B 21/00; F25B 2321/02; F25B 21/02
See application file for complete search history.

(56) References Cited

U.S. PATENT DOCUMENTS 8,104,293 B2   1/2012  Barve et al.
2004/0093877 A1  5/2004  Wada et al.
(Continued)

FOREIGN PATENT DOCUMENTS

CN   102516950 A   6/2012
GB   2482884 A    2/2012
(Continued)

OTHER PUBLICATIONS

International Search Report dated Feb. 16, 2016 in PCT/EP2015/078848 filed Dec. 7, 2015.
(Continued)

*Primary Examiner* — Brian M King
(74) *Attorney, Agent, or Firm* — Oblon, McClelland, Maier & Neustadt LLP

(57) ABSTRACT

A magnetocaloric cascade contains a sequence of magnetocaloric material layers having different Curie temperatures $T_C$, wherein the magnetocaloric material layers include a cold-side outer layer, a hot-side outer layer and at least three inner layers between the cold-side outer layer and the hot-side outer layer, and each pair of next neighboring magnetocaloric layers of the magnetocaloric cascade has a respective Curie-temperature difference amount $\Delta T_C$ between their respective Curie temperatures, wherein the hot-side outer layer or the cold-side outer layer or both the hot-side and cold-side outer layer exhibits a larger ratio $m\Delta S_{max}/\Delta T_C$ in comparison with any of the inner layers, m denoting the mass of the respective magnetocaloric material layer and $\Delta S_{max}$ denoting a maximum amount of isothermal (Continued)

magnetic entropy change achievable in a magnetic phase transition of the respective magnetocaloric material layer.

15 Claims, 6 Drawing Sheets

(56) References Cited

U.S. PATENT DOCUMENTS

| | | | |
|---|---|---|---|
| 2011/0094243 A1 | 4/2011 | Carroll et al. | |
| 2011/0173993 A1 | 7/2011 | Muller et al. | |
| 2012/0043497 A1* | 2/2012 | Katter | H01F 1/015 |
| | | | 252/67 |
| 2013/0019610 A1* | 1/2013 | Zimm | F25B 21/00 |
| | | | 62/3.1 |

FOREIGN PATENT DOCUMENTS

| | | |
|---|---|---|
| WO | WO 03/012801 A1 | 2/2003 |
| WO | WO 2004/068512 A1 | 8/2004 |
| WO | WO 2014/115057 A1 | 7/2014 |

OTHER PUBLICATIONS

Nguyen H. Dung, et al., "Mixed Magnetism for Refrigeration and Energy Conversion", Advanced Energy Materials, vol. 1, XP055246888, 2011, pp. 1215-1219.
A. Rowe, et al., "Experimental investigation of a three-material layered active magnetic regenerator", International Journal of Refrigeration, vol. 29, XP027948436, 2006, pp. 1286-1293.
Office dated Dec. 4, 2018, in Chinese Examination Report patent application No. 201580068084.5 with English translation.

* cited by examiner

MAGNETOCALORIC CASCADE AND METHOD FOR FABRICATING A MAGNETOCALORIC CASCADE

The present invention is related to a magnetocaloric cascade and to a method for fabricating a magnetocaloric cascade. It is further related to a magnetocaloric regenerator, a heat pump and a heat-pumping method involving the use of a magnetocaloric cascade.

Due to advances in materials research, the magnetocaloric effect (MCE) has emerged as an economically viable alternative to known fluid circulation cooling methods for industry and commercial applications even at room temperature, such as refrigerators, cooling systems for cryoproduction in the process industry, and air conditioning systems. Another field of application of the magnetocaloric effect is in thermomagnetic power generators, i.e., in the conversion of heat to electrical energy.

The magnetocaloric effect occurs under application of an external magnetic field to a suitable magnetocaloric material and under an ambient temperature in the vicinity of its Curie temperature. The applied external magnetic field causes an alignment of the randomly aligned magnetic moments of the magnetocaloric material and thus a magnetic phase transition, which can also be described as an induced increase of the Curie temperature of the material above the ambient temperature. This magnetic phase transition implies a loss in magnetic entropy and in an adiabatic process (thermal isolation from the ambient temperature) leads to an increase in the entropy contribution of the crystal lattice of the magnetocaloric material by phonon generation. As a result of applying the external magnetic field, therefore, a heating of the magnetocaloric material occurs.

In technical cooling applications, this additional heat is removed from the material by heat transfer to an ambient heat sink in the form or a heat transfer medium. Water is an example of a heat transfer medium used for heat removal from the magnetocaloric material. Subsequently removing the external magnetic field can be described as a decrease of the Curie temperature back below the ambient temperature, and thus allows the magnetic moments reverting back to a random arrangement. This causes an increase of the magnetic entropy and a reduction of the entropy contribution of the crystal lattice of the magnetocaloric material itself, and in adiabatic process conditions thus results in a cooling of the magnetocaloric material below the ambient temperature. The described process cycle including magnetization and demagnetization is typically performed periodically in device applications.

The described cooling effect can be increased by designing the magnetocaloric material as a sequence of layers with decreasing Curie temperatures, or, in other words, as a magnetocaloric cascade containing two or more magnetocaloric material layers in succession by descending Curie temperature. In such a magnetocaloric cascade, the first magnetocaloric material cools down the second magnetocaloric material to a temperature near the Curie temperature of the second magnetocaloric material, and so on with any further magnetocaloric material contained in the cascade. This way, the cooling effect achieved can be greatly increased in comparison with the use of a single magnetocaloric material.

US 2004/0093877 A1 discloses a magnetocaloric material exhibiting a magnetocaloric effect at or near room temperature and a magnetic refrigerator using such magnetocaloric material. Different compositions of the magnetocaloric material yield different magnetocaloric materials exhibiting different Curie temperatures, i.e., different temperatures of the magnetic phase transition. The magnetocaloric materials are arranged in a first and a second regenerator bed which are exposed to varying magnetic fields. The regenerators form the core of a magnetic refrigerator. Similarly, WO 2004/068512 A1 and WO 2003/012801 describe magnetocaloric materials having different Curie temperatures obtained from a material system of a certain composition by varying of individual constituents or the relative amounts of individual constituents.

US2011/0094243 describes heat exchanger beds composed of a cascade of at least three different magnetocaloric materials with different Curie temperatures which are arranged in succession by ascending or descending Curie temperature and are insulated from one another by intermediate thermal and/or electrical insulators, the difference in the Curie temperatures of adjacent magnetocaloric materials being 0.5 to 6 K.

U.S. Pat. No. 8,104,293 B2 discloses a magnetocaloric cooling device comprising a plurality of thermally coupled magnetocaloric elements, one or more reservoirs containing a fluid medium and two heat exchangers. The heat exchangers are thermally coupled to the magnetocaloric elements and to at least one of the reservoirs for transferring heat between the magnetocaloric elements and the environment through the fluid medium.

US 2011/0173993 A1 discloses a magnetocaloric element comprising at least two adjacent sets of magnetocaloric materials arranged according to an increasing Curie temperature. The magnetocaloric materials within a same set have a same Curie temperature. The magnetocaloric element further comprises initiating means for initiating a temperature gradient between two opposite hot and cold ends of the magnetocaloric element.

WO 2014/115057 A1 describes a magnetocaloric cascade containing at least three different magnetocaloric materials with different Curie temperatures, which are arranged in succession by descending Curie temperature, wherein none of the different magnetocaloric materials with different Curie temperatures has a higher layer performance Lp than the magnetocaloric material with the highest Curie temperature. At least one of the different magnetocaloric materials with different Curie temperatures has a lower layer performance Lp than the magnetocaloric material with the highest Curie temperature. The layer performance Lp of a particular magnetocaloric material layer is calculated according to formula: $Lp=m*dT_{ad,max}$ with $dT_{ad,max}$: maximum adiabatic temperature change which the particular magnetocaloric material undergoes when it is magnetized from a low magnetic field to high magnetic field during magnetocaloric cycling, and m: mass of the particular magnetocaloric material contained in the magnetocaloric cascade.

According to a first aspect of the present invention, a magnetocaloric cascade containing a sequence of at least three magnetocaloric material layers having different Curie temperatures $T_C$ is provided, wherein the magnetocaloric material layers include a cold-side outer layer, a hot-side outer layer and at least three inner layers between the cold-side outer layer and the hot-side outer layer, and each pair of next neighboring magnetocaloric layers of the magnetocaloric cascade has a respective Curie-temperature difference amount $\Delta T_C$ between their respective Curie temperatures, wherein the hot-side outer layer or the cold-side outer layer or both the hot-side and cold-side outer layer exhibits a larger ratio $m\Delta S_{max}/\Delta T_C$ in comparison with any of the inner layers, m denoting the mass of the respective magnetocaloric material layer and $\Delta S_{max}$ denoting a maximum amount of isothermal magnetic entropy change achievable in a magnetic phase transition of the respective magnetocaloric material layer.

The parameter $\Delta S$ is a measure of an amount of isothermal magnetic entropy change that is achievable in a magnetic phase transition of the respective magnetocaloric material layer. The amount of isothermal magnetic entropy change can be determined by techniques known in the art, for instance by deduction from isothermal magnetization data or by deduction from isofield heat capacity data. It is a function of temperature. It may be quantified for instance in units of $J/cm^3/K$ or, more commonly, $J/kg/K$. For reasons of simplicity, even though an amount is meant in the present context, the parameter is not denoted herein by $|\Delta S|$, but by $\Delta S$ The parameter $\Delta S$ quantifies a characteristic of a given magnetocaloric material layer and thus forms a parameter that is individually controllable layer per layer by proper design of the magnetocaloric cascade. A maximum amount $\Delta S_{max}$ of the isothermal magnetic entropy change is achievable at the Curie temperature $T_C$ of a given magnetocaloric material.

The parameter $m\Delta S_{max}$ thus forms the absolute maximum of the entropy parameter $m\Delta S$ as a function of temperature. It is a measure of an absolute maximum of the amount of isothermal magnetic entropy change that is achievable in a magnetic phase transition of the respective magnetocaloric material layer having a given mass m. For many magnetocaloric materials, the maximum amount of the isothermal magnetic entropy change is achievable at the Curie temperature $T_C$ of the given magnetocaloric material. The parameter $m\Delta S_{max}$ is unambiguously defined for a given layer of a given mass and a given material composition due to a characteristic line shape of the temperature dependence of $\Delta S$ as a function of temperature. A magnetocaloric material therefore only has a single $\Delta S_{max}$ Typically, different magnetocaloric materials have different values of $\Delta S_{max}$. Modifying the mass of a given layer can not only be used to adapt the crossing-point value of the entropy parameter $m\Delta S$ with respect to a neighboring layer, but also to adapt the maximum $m\Delta S_{max}$.

The parameter $\Delta T_C$ denotes a difference amount between Curie temperatures of a given layer and one next neighboring magnetocaloric material layer. Here, the respective Curie temperatures as measurable in absence of any applied magnetic field are meant. While the Curie temperature $T_C$ is a parameter that quantifies a characteristic of a given magnetocaloric layer, the parameter $\Delta T_C$ describes a property of a given layer sequence of two layers, namely, a given layer and its next neighboring magnetocaloric layer of the cascade. As such, the parameter $\Delta T_C$ reaches beyond a given individual layer. It relates to the design of the sequence of layers in the magnetocaloric cascade.

Regarding the definition of $\Delta T_C$, the following is noted: For reasons of simplicity, even though an amount is meant, the parameter is not denoted by $|\Delta T_C|$, but by $\Delta T_C$ Furthermore, an ambiguity may be seen on first sight in the above definition of $\Delta T_C$. For an inner layer of the cascade, two different values of the parameter $\Delta T_C$ could in principle be determined, because an inner layer has two next neighboring layers, one on each side. However, when comparing the parameter values of $\Delta T_C$ within a cascade, no such ambiguity occurs because there is an order of determination of $\Delta T_C$ along one of the two possible directions along the cascade. Suitably, the order of determination follows the direction of heat flow through the cascade, which depends on a given application case (cooling or heating). In any case, the set of values of $\Delta T_C$ across a given cascade is identical irrespective of the order of determination. For the hot-side layer and the cold-side layer, of course, there is only one next neighboring layer because the hot-side layer and the cold-side layer form the outer layers of the cascade.

Maximizing the parameter $m\Delta S_{max}/\Delta T_C$ at the hot-side layer or the cold-side layer of the cascade in comparison with the inner layer(s) of the cascade in embodiments further improves the performance of the cascade as a whole, as will be shown further below by way of examples. The achieved effect can also be described as a strengthening of the cascade at its respective outer end facing a hot side or a cold side of a heat pump.

The present invention thus recognizes the significance of the entropy parameter $m\Delta S_{max}/\Delta T_C$ at the outer layer for improving the performance of the magnetocaloric cascade in pumping heat between a hot side and a cold side. The invention provides a performance improvement if only one of the hot-side and cold-side outer layers is improved by exhibiting a larger ratio $m\Delta S_{max}/\Delta T_C$ than any of the inner layers, and even more so if both of the hot-side and cold-side outer layers is improved this way.

In the following, embodiments of the magnetocaloric cascade of the first aspect of the invention will be described.

An improvement is already achieved with a relatively small difference of $m\Delta S_{max}/\Delta T_C$ in one of the hot side or cold-side outer layers in comparison with the inner layers. In preferred embodiments, the hot-side outer layer or the cold-side outer layer exhibits an amount of the ratio $m\Delta S_{max}/\Delta T_C$ that is at least 1% larger in comparison with any of the inner layers. The use of "or" here is meant to include the case that the hot-side outer layer and the cold-side outer layer exhibits an amount of the ratio $m\Delta S_{max}/\Delta T_C$ that is at least 1% larger in comparison with any of the inner layers as a further embodiment.

The advantageous effect of the present embodiment on the heat pumping capacity of the magnetocaloric cascade in comparison with known cascade designs becomes particularly strong towards higher temperature spans between the hot and cold sides of the cascade. This temperature span typically finds an at least approximate correspondence in the difference between the Curie temperatures of the hot-side outer layer and the cold-side outer layer. In comparison with prior-art designs for a given temperature span, such embodiments achieve heat pumping with improved performance also at a temperature difference between the Curie temperatures of the hot-side outer layer and the cold-side outer layer, which is larger than a nominal temperature span.

In three alternative embodiments of the magnetocaloric cascade, the strengthening measures described above with respect to the outer layers of the cascade concern a) the hot-side outer layer alone or b) the cold-side outer layer alone, or c) both the hot-side outer layer and the cold-side outer layer. Thus, when stating that the hot-side outer layer or the cold-side outer layer exhibits a larger ratio $m\Delta S_{max}/\Delta T_C$ in comparison with any of the inner layers, the term "or" is to be understood as including all three mentioned alternatives.

Different measures for adapting the of the ratio of the maximum amount of the entropy parameter $m\Delta S$ and the Curie temperature spacing, $\Delta T_C$, i.e., $m\Delta S_{max}/\Delta T_C$, can be used, either alone or in combination with each other, for accomplishing the design of suitable embodiments of the cascade.

One such measure implemented in some embodiments is increasing the amount of $\Delta S_{max}$ in comparison with any of the inner layers. A variation of $\Delta S_{max}$ can for instance be achieved by proper material choice, of course taking into account requirements of a given application case regarding the Curie temperature. Preferably, the hot-side outer layer or the cold-side outer layer exhibits an amount of the ratio $m\Delta S_{max}/\Delta T_C$ that is at least 1% larger in comparison with any of the inner layers. In other embodiments, $m\Delta S_{max}/\Delta T_C$ is larger by at least 5% at the hot-side outer layer or the cold-side outer layer than at any of the at least one inner layers. In another embodiment, the parameter $m\Delta S_{max}/\Delta T_C$ is larger at the hot-side outer layer or the cold-side outer layer than at any of the at least one inner layers by at least 10%. In one embodiment, the hot-side outer layer or the cold-side outer layer exhibits an amount of the ratio $m\Delta S_{max}/\Delta T_C$ that is at least 20% larger in comparison with any of the inner layers. In yet another embodiment, the hot-side outer layer or the cold-side outer layer exhibits an amount of the ratio $\Delta S_{max}/\Delta T_C$ that is no more than 150%, in other embodiments no more than 100% larger in comparison with any of the inner layers. The heat-pumping-power improvement increases almost in proportion with increasing the percentage by which the ratio $m\Delta S_{max}/\Delta T_C$ is higher at the hot-side outer layer or the cold-side outer layer than at the inner layers. However, increasing the ratio by selecting a magnetocaloric material with a higher maximum $\Delta S_{max}$ of the entropy parameter requires attention to the line-width (FWHM) of the temperature dependence of $\Delta S$ of the selected material so as to achieve a high crossing-point value in combination with a given neighboring layer.

In accordance with another measure that can be used in the alternative or in combination with the mentioned measure, the hot-side outer layer or the cold-side outer layer exhibits a smaller amount of $\Delta T_C$ in comparison with any of the inner layers. As is known per se, in material systems of magnetocaloric materials a variation of $\Delta T_C$ can for instance be achieved by adaptation of stoichiometry, i.e., the different fractions of the constituent elements in the material composition within the given material system for designing a given layer of the cascade. In a further embodiment of the magnetocaloric cascade, the hot-side layer or the cold-side layer exhibits an amount of $\Delta T_C$ that is at least 0.2% smaller in comparison with those any of the at least one inner layer. In another embodiment of the magnetocaloric cascade, the hot-side layer or the cold-side layer exhibits an amount of $\Delta T_C$ that is at least 5% smaller in comparison with those any of the at least one inner layer. However, with regard to the lower end of preferred amounts of $\Delta T_C$, the hot-side layer or the cold-side layer preferably exhibits an amount of $\Delta T_C$ that is no less than 0.25 K, preferably no less 0.5 K.

Another design parameter that is used in some embodiments to influence the crossing-point values of the entropy parameter $\Delta S$ is the line width of its temperature dependence, for instance the full width at half the maximum amount ($\Delta S_{max}$), to be determined in units of K. To increase a large line width and thus increase the crossing-point value for a given pair of neighboring magnetocaloric layers, a mix of different magnetocaloric layers can be used in at least one of the layers. In some such embodiments, a sublayer sequence can be used, preferably one that does not reduce the maximum amount $\Delta S_{max}$ of the mix or sublayer sequence in comparison with a single layer.

The magnetocaloric cascade can be implemented with any suitable combination of magnetocaloric material layers. For each pair of next neighboring magnetocaloric material layers of the magnetocaloric cascade there exists a respective crossing temperature, at which an entropy parameter $m\Delta S$ of both respective neighboring magnetocaloric material layers assumes the same crossing-point value, the entropy parameter $m\Delta S$ being defined as a product of the mass m of the respective magnetocaloric material layer and an amount of its isothermal magnetic entropy change $\Delta S$ in a magnetic phase transition of the respective magnetocaloric material layer. In preferred embodiments, all crossing-point values of an entropy parameter $m\Delta S$ of all pairs of next neighboring inner layers are equal, either exactly or within a margin of $\pm 15\%$, to a mean value of all crossing-point values of all pairs of next neighboring inner layers of the magnetocaloric cascade.

The margin of variation of the crossing-point values of the entropy parameter $m\Delta S$ of all pairs of next neighboring inner layers with respect to the mean value of all crossing-point values of all pairs of next neighboring inner layers of the magnetocaloric cascade is in some embodiments even smaller than $\pm 15\%$. In some embodiments, the margin is $\pm 10\%$, in others even only $\pm 5\%$. The smaller the margin of variation, the higher tends to be the achieved improvement in the performance of the magnetocaloric cascade in pumping heat between a hot side and a cold side.

To achieve a high heat-pumping power in operation of the cascade, different magnetocaloric material layers of the cascade exhibit respective materials and respective masses which in combination provide the crossing-point values of the entropy parameter $m\Delta S$ across the magnetocaloric cascade at no less than 60%, in some other embodiments no less than 70%, in further embodiments no less than 80% of a global maximum of the entropy parameter $m\Delta S$ assumed in any of the magnetocaloric layers across the magnetocaloric cascade.

Due to different material properties, the temperature dependences of the entropy parameter exhibit line shapes that may differ considerably in their respective maximum amount $m\Delta S_{max}$ and in their width, for instance to be determined as a full width at half maximum (FWHM) with respect to the maximum amount $m\Delta S_{max}$. A suitable choice of materials of the magnetocaloric cascade in this regard takes into account the Curie temperature spacing $\Delta T_C$ between neighboring layers of the cascade. The smaller the Curie temperature spacing between two neighboring magnetocaloric layers of the cascade, the higher is typically the crossing-point value of the entropy parameter for these two layers. Furthermore, a width measure characterizing a function describing the temperature dependence of the entropy parameter $m\Delta S$ forms a suitable parameter for influencing the amount of the crossing-point value of the entropy parameters of neighboring magnetocaloric materials in design of the cascade. For instance, for a given Curie-temperature spacing, increasing a full width at half maximum (FWHM) of the temperature dependence of the entropy parameter $m\Delta S$ of at least one of two neighboring layers by suitable material selection typically increases the crossing-point value of the entropy parameter for two neighboring magnetocaloric materials in the cascade (assuming for simplicity of explanation that the maximum amount $m\Delta S_{max}$ does not change). The Curie temperature spacing $\Delta T_C$ and the FWHM may not only be determined by material selection from a given discrete set of materials. In some material systems, these parameters can be adapted quasi continuously by selecting a suitable composition of the magnetocaloric materials for the respective magnetocaloric layers. Several material systems covering different constituent elements in ranges of stoichiometries are known. Magnetocaloric material systems, from which materials for use in any of the embodiments of the magnetocaloric cascade can be selected in accordance with the respective requirements of the embodiments described herein, are for instance disclosed in WO 2014/115057A1, page 11, line 26, to page 14, line 31. The publication WO 2014/115057A1 as a whole is hereby incorporated by reference into the present specification. Example material systems are MnFePAs, MnAsSb, and MnFePSiGe. Such material systems offer a substantially continuous coverage of a range of Curie temperatures. A Curie temperature that is suitable for a particular magnetocaloric layer in a cascade design can be achieved by setting a proper stoichiometry of the constituent elements of the material within the material system. On the other hand, a broadening of the FWHM of the temperature dependence of the entropy parameter can for instance be achieved by mixing materials with slightly different stoichiometries into a single layer or by providing a magnetocaloric material layer with a sublayer structure, wherein the sublayers have slightly different stoichiometries, instead of a magnetocaloric layer of equal thickness and homogenous composition.

In some embodiments of the cascade of the present invention, magnetocaloric layers from different material systems are used in the cascade. These embodiments provide particularly high design flexibility for implementing the cascade design in accordance with the present invention. It is noted that magnetocaloric materials having a difference in their chemical constituents or stoichiometric composition are considered identical materials in the context of the present disclosure, provided that their material parameters relevant for implementing the magnetocaloric cascade in accordance with a given embodiment of the present invention assume identical values.

Typically, in many embodiments of the cascade of the present invention, neither the hot-side outer layer nor cold-side outer layer fulfils the crossing-point-value requirements that applies to the inner layers in accordance with the previously described embodiments. For clarity of reference, these embodiments will be referred to as the first group in the next paragraph. However, it is noted that in other embodiments of the cascade, it is not only the inner layers that exhibit this particular design with respect to the crossing-point values of the entropy parameter $m\Delta S$. In addition, (in a second group of embodiments) a cold-side outer layer pair formed by the cold-side outer layer and its next neighboring cold-side inner layer, or (in a third group of embodiments) a hot-side outer layer pair formed by the hot-side outer layer and its next neighboring hot-side inner layer also exhibit a crossing-point value of the entropy parameter $m\Delta S$ that is equal, either exactly or within the margin of ±15%, to the mean value of all crossing-point values of all pairs of next neighboring inner layers of the magnetocaloric cascade.

According to a second aspect of the present invention, a magnetocaloric regenerator is provided that includes a magnetocaloric cascade according to the first aspect of the present invention or one of its embodiments.

The magnetocaloric regenerator shares the advantages of the magnetocaloric cascade of the first aspect of the invention.

The magnetocaloric regenerator can be implemented in many different embodiments. Some of these different embodiments comprise the magnetocaloric cascade of the first aspect in respective different shapes. In some embodiments, a plate shape is used. In other embodiments, the magnetocaloric cascade comprises one or more channels extending through the magnetocaloric cascade for accommodating a heat transfer fluid, or a plurality of microchannels. The magnetocaloric generator may comprise the magnetocaloric material layers in respective different material shapes. A magnetocaloric material layer is in some embodiments formed by a solid material layer or a porous material layer. In other embodiments it is formed by particles, which can be spherically-shaped, non-spherically shaped such as disk-shaped or irregularly-shaped compounds.

According to a third aspect of the present invention a heat pump comprising a magnetocaloric regenerator according to the second aspect of the invention or one of its embodiments is provided. The heat pump shares the advantages of the magnetocaloric regenerator of the second aspect of the invention.

In the following, embodiments of the heat pump will be described.

Embodiments of the heat pump are suitably configured to cyclically perform a pumping sequence including a temperature increase and a temperature decrease of the heat-pump working body.

The heat pump of further suitable embodiments further comprises a hot-side interface in thermal communication with the hot-side outer layer, a cold-side interface in thermal communication with the cold-side outer layer, and a heat transfer system, which is configured to provide a flow of a heat-transfer fluid between the hot-side interface and the cold side interface through the magnetocaloric cascade, wherein the Curie temperature of the hot-side outer layer is selected to be higher than a temperature of the hot-side interface in operation of the heat pump, or the Curie temperature of the cold-side outer layer is selected to be lower than a temperature of the cold-side interface in operation of the heat pump. In a cooling application, for example, the cold-side interface is configured to be in thermal contact with an object to be cooled, and the hot-side interface is configured to be in thermal contact with a heat sink.

According to a fourth aspect of the present invention, a method for fabricating a magnetocaloric cascade is provided. The method comprises fabricating a sequence of different magnetocaloric material layers having different Curie temperatures $T_C$, wherein the magnetocaloric material layers include a cold-side outer layer, a hot-side outer layer and at least three inner layers between the cold-side outer layer and the hot-side outer layer and each pair of next neighboring magnetocaloric layers of the magnetocaloric cascade has a respective Curie-temperature difference amount $\Delta T_C$ between their respective Curie temperatures, wherein the hot-side outer layer or the cold-side outer layer or both the hot-side and cold-side outer layer are fabricated so as to exhibit a larger ratio $m\Delta S_{max}/\Delta T_C$ in comparison with any of the inner layers, m denoting the mass of the respective magnetocaloric material layer and $\Delta S_{max}$ denoting a maximum amount of isothermal magnetic entropy change achievable in a magnetic phase transition of the respective magnetocaloric material layer. The method of the fourth aspect of the invention achieves the advantages described hereinabove in the context of the magnetocaloric cascade of the first aspect of the invention. Embodiments of the method involve fabricating a cascade so as to further include the additional features its embodiments as described in the context of the first aspect of the invention.

In one embodiment, all crossing-point values of an entropy parameter $m\Delta S$ of all pairs of next neighboring inner layers are equal, either exactly or within a margin of ±15%, to a mean value of all crossing-point values of all pairs of next neighboring inner layers of the magnetocaloric cascade.

According to a fifth aspect of the invention, a heat-pumping method comprises performing a heat-pumping sequence using a magnetocaloric regenerator comprising a magnetocaloric cascade according to the first aspect of the invention or one of its embodiments.

In the following, embodiments of the heat-pumping method will be described.

In one embodiment, the pumping sequence includes a temperature increase of the magnetocaloric cascade which is performed in thermal communication with a heat sink. The pumping sequence is performed using a magnetocaloric cascade with the hot-side outer layer being a magnetocaloric layer with a Curie temperature that is between 0.5 K and 5 K higher than a heat-sink temperature.

Further embodiments are disclosed in the enclosed claims.

In the following, further embodiments will be described with reference to the enclosed drawings. In the drawings.

Figure 10:
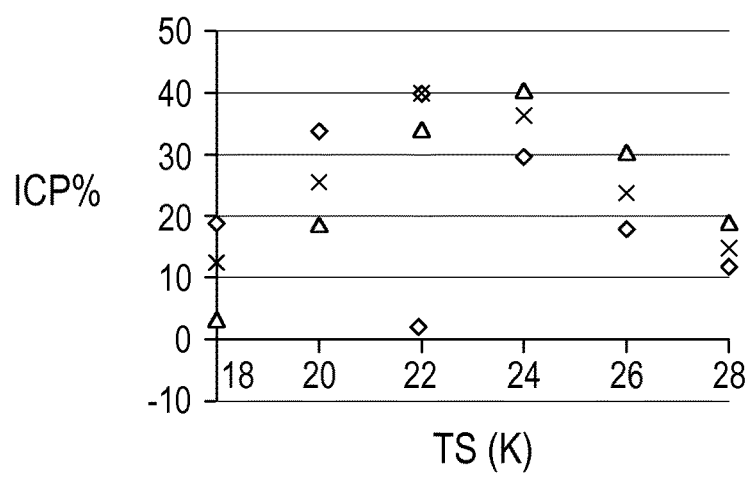
Figure 11:
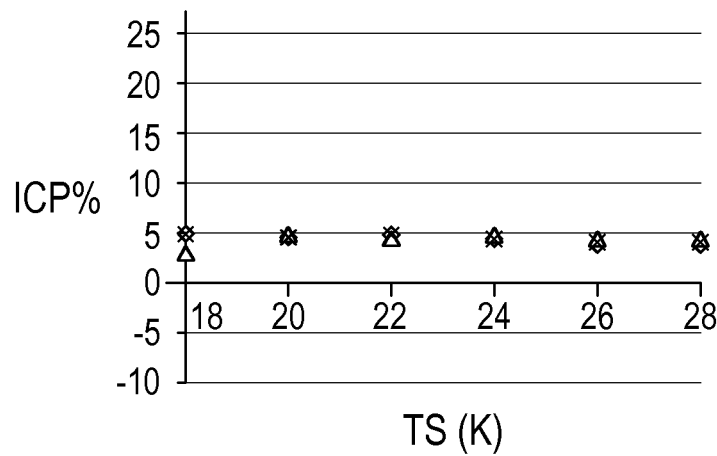
Figure 12:
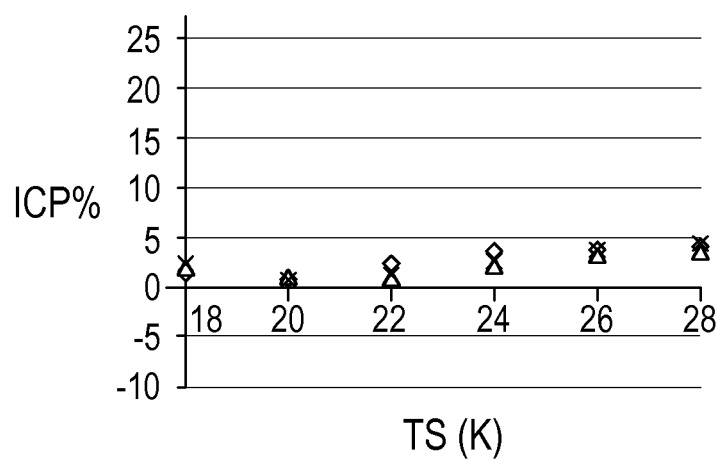

FIG. 10 shows a diagram illustrating an improvement in cooling power of an embodiment of the magnetocaloric cascade using materials of different maximum isothermal magnetic entropy change $\Delta S_{max}$ in both the hot-side and cold-side outer layers than in the inner layers of the cascade, for different temperature spans between a hot-side temperature and a cold-side temperature, for three different hot-side temperatures in comparison with the second reference structure;

FIG. 11 shows a diagram illustrating an improvement in cooling power of an embodiment of the magnetocaloric cascade having a higher mass in both the hot-side and cold-side outer layers than in the inner layers of the cascade, for different temperature spans between a hot-side temperature and a cold-side temperature, for three different hot-side temperatures in comparison with the second reference structure; and FIG. 12 shows a diagram illustrating an improvement in cooling power of an embodiment of the magnetocaloric cascade having a reduced Curie temperature spacing at only the cold-side outer layer and an increased Curie temperature spacing at the other layers of the cascade, for different temperature spans between a hot-side temperature and a cold-side temperature, for three different hot-side temperatures in comparison with the second reference structure.

Figure 1:
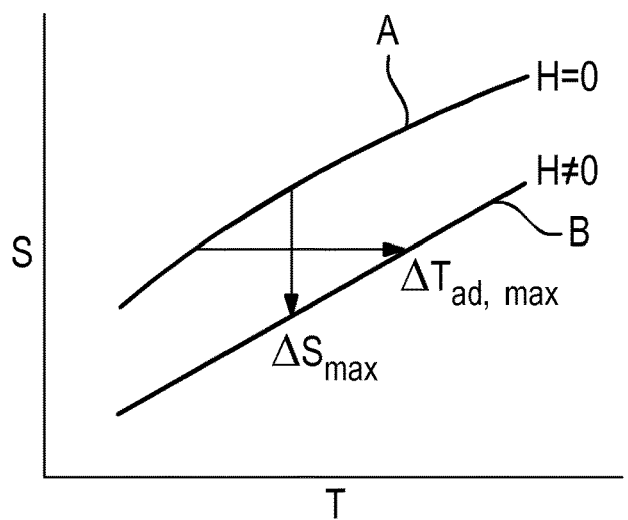
FIG. 1 shows a schematic diagram illustrating a difference in a dependence of magnetic entropy on temperature for the cases of exposure and non-exposure of a magnetocaloric material to a magnetic field near its Curie temperature.

FIG. 1 shows a diagram in which an entropy S is plotted in linear units (Joule/Kelvin) as a function of temperature T, also in linear units of Kelvin for a magnetocaloric material layer. The curves shown in the diagram are also referred to as ST curves. The diagram is purely schematic and only serves to illustrate the following. The magnetocaloric material layer exhibits different ST curves under application of magnetic fields of different amounts. Two exemplary curves A and B illustrate the cases H=0 (no magnetic field applied) and H≠0 (application of a magnetic field of a certain amount). The ST curve of the case H=0 is found at higher entropy levels, which is due to the higher contribution of the magnetic entropy to the shown overall entropy of the magnetocaloric material layer. Further contributions to the entropy S are provided by the crystal lattice and by the electrons of the magnetocaloric material of the layer. Under application of the magnetic field that is strong enough to cause a phase transition of the magnetocaloric material layer leading to an orientation of all magnetic moments along the direction of the magnetic field vector the magnetic entropy at the given temperature drops by an amount $\Delta S_{max}$. This gives rise to a temperature increase. A maximum of the temperature increase in an adiabatic process amounts to $\Delta T_{ad, max}$ and occurs at a temperature that is different from that, at which $\Delta S_{max}$ is observable, as shown in FIG. 1.

Figure 2:
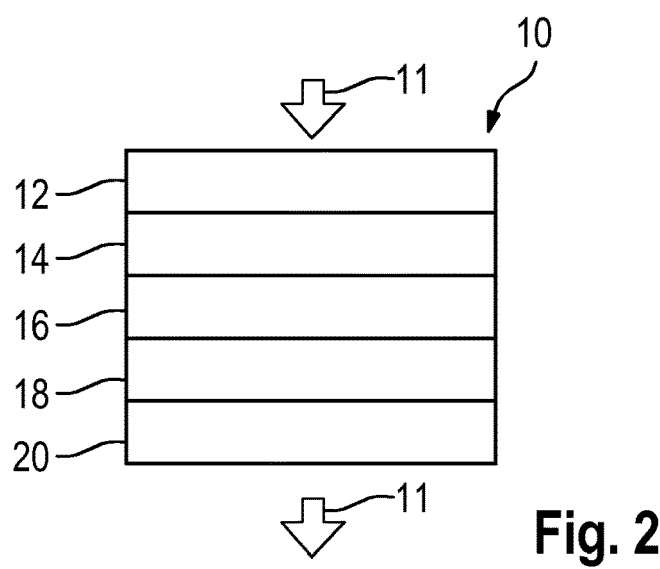
FIG. 2 shows an embodiment of a magnetocaloric cascade.
Figure 3:
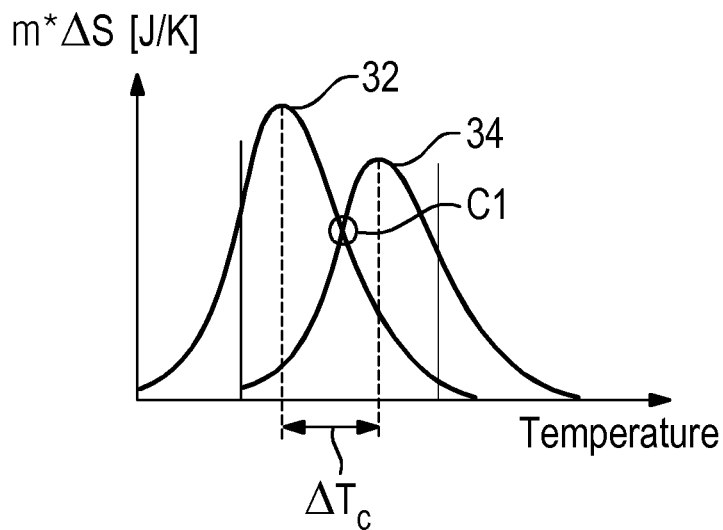
FIGS. 3 and 4 are illustrations of the temperature dependence of the mass-weighted isothermal magnetic entropy change in a magnetic phase transition (i.e., the entropy parameter) of two next neighboring magnetocaloric material layers in two different embodiments of a magnetocaloric cascade.
Figure 4:
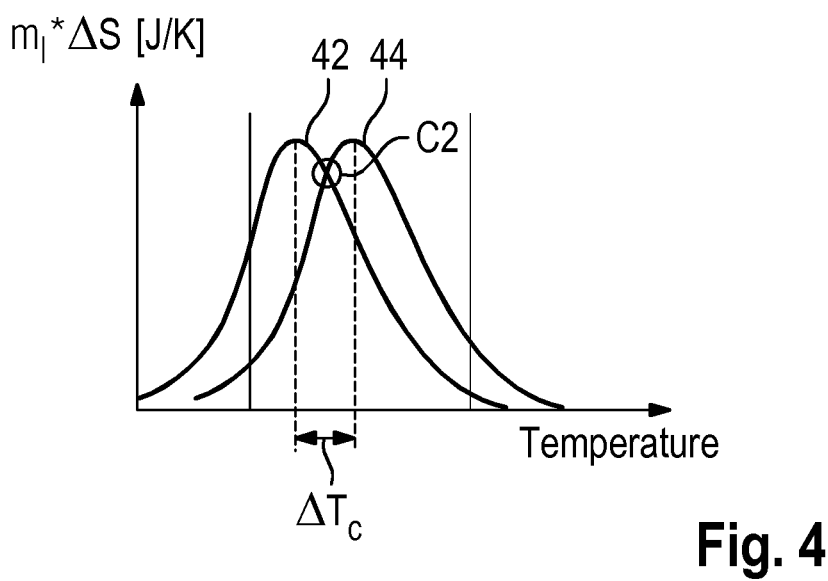

FIG. 2 shows an embodiment of a magnetocaloric cascade 10 for use as a magnetocaloric regenerator, and thus as a working body of a cooling device for pumping heat in a direction indicated by arrows 11. The cascade 10 is formed of a layer sequence of magnetocaloric material layers 12 to 20. In particular, the cascade has a cold-side outer layer 12 followed by a plurality of magnetocaloric inner layers, of which the inner layers 14, 16 and 18 are provided in the present example. Furthermore, the cascade has a hot-side outer layer 20. The layer pair (12,14) formed by the cold-side outer layer 12 and the next neighboring inner layer 14 is herein also referred to as the cold-side outer layer pair. The layer pair (18, 20) formed by the hot-side outer layer 20 and the next neighboring inner layer 18 is herein also referred to as the hot-side outer layer pair. Based on design options according to the present invention, which are explained in the following with reference to FIGS. 3 and 4, the cascade 10 achieves a particularly high performance in heat-pumping applications. FIGS. 3 and 4 are illustrations of the temperature dependence of the mass-weighted isothermal magnetic entropy change in a magnetic phase transition (i.e., the entropy parameter) of two next neighboring magnetocaloric material layers 52, 54 and 62, 64 in two different embodiments of a magnetocaloric cascade according to the present invention. The magnetocaloric cascades referred to in FIGS. 3 and 3 comprise a plurality of magnetocaloric layers. In particular at least three inner layers are provided. However, any information about the further layers of the cascade is omitted in FIGS. 3 and 4 for reasons of simplicity. The two next neighboring magnetocaloric material layers 32, 34 and 42, 44, which are shown, form a respective outer layer pair. In other words, the layers 32 and 42 are hot-side or cold-side outer layers, and will be referred to in short as outer layers in the following. The respective next neighboring layers 34 and 44 form inner layers in the wording of the claims.

The outer layers 32 and 42 of both embodiments are strengthened in these two embodiments of the present invention, as will be explained in the following. In the embodiment of FIG. 3, the outer layer 32 has a higher maximum amount $m\Delta S_{max}$ of the entropy parameter $m\Delta S$ in comparison with the next neighboring inner layer 34. This property of the outer layer 32 can be achieved by proper material selection or by suitable setting of the mass of the outer layer 32. Selecting a material and/or a mass for the outer layer 32 that in comparison with the next neighboring inner layer 34 leads to a higher maximum amount $m\Delta S_{max}$ of the entropy parameter $m\Delta S$ tends to increase the crossing point value C5 of $m\Delta S$ of the two curves shown in FIG. 3, given a suitable actual amount of $m\Delta S_{max}$ and the full width at half maximum of the temperature dependence of the entropy parameter $m\Delta S$. In some embodiments implementing the situation of FIG. 3 the crossing point value C5 is outside the margin of ±15% with respect to the mean value $m\Delta S_{mean}$ of all crossing-point values of all pairs of next neighboring inner layers of the magnetocaloric cascade. In other embodiments, it falls within this margin, however fulfilling exact equality.

In the embodiment of FIG. 4, the outer layer 42 has the same maximum amount $m\Delta S_{max}$ of the entropy parameter $m\Delta S$ in comparison with the next neighboring inner layer 44. However, the materials of the layers are selected so that their Curie temperature spacing $\Delta T_C$ is smaller in comparison with the embodiment of FIG. 3. This also leads to an increased crossing-point value C6 of the entropy parameter $m\Delta S$ with reference to its respective highest maximum value across the cascade. Selecting a the Curie-temperature difference between the outer layer 62 and the next neighboring inner layer tends to increase the crossing point value C6 of $m\Delta S$ of the two curves shown in FIG. 3, given a suitable full width at half maximum of the temperature dependence of the entropy parameter $m\Delta S$. In some embodiments implementing the situation of FIG. 4 the crossing point value C6 is outside the margin of ±15% with respect to the mean value $m\Delta S_{mean}$ of all crossing-point values of all pairs of next neighboring inner layers of the magnetocaloric cascade. In other embodiments, it falls within this margin, without, however fulfilling exact equality.

Both measures described achieve an improvement of heat-pumping performance.

Figure 5:
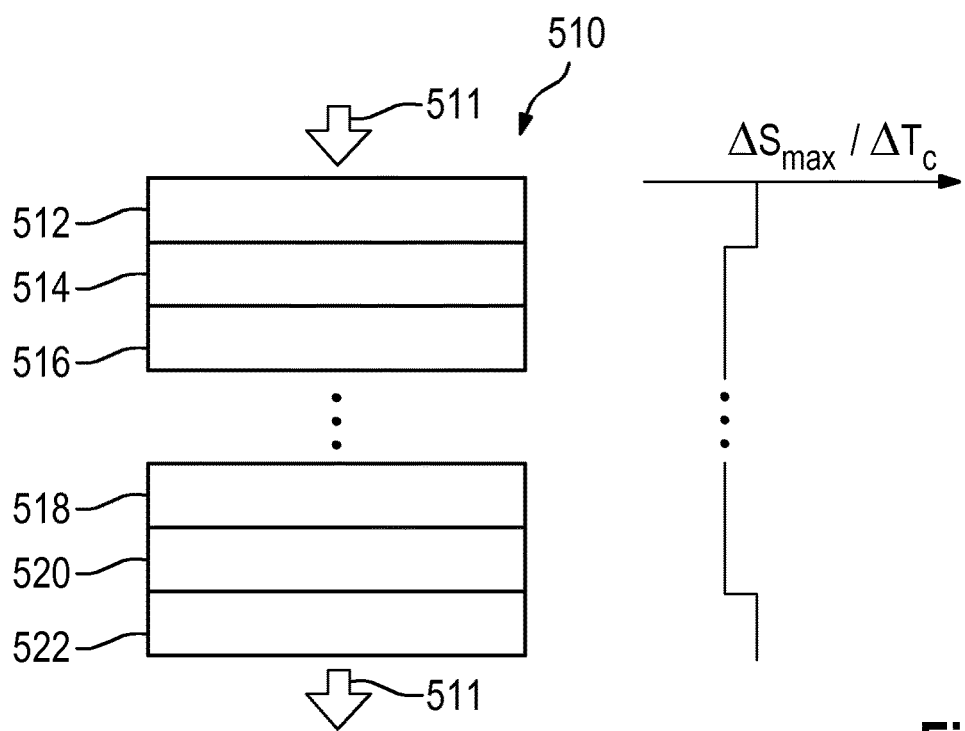
FIG. 5 shows a further embodiment of a magnetocaloric cascade.

FIG. 5 shows a schematic illustration of a further embodiment of a magnetocaloric cascade 510 for use as a magnetocaloric regenerator in a cooling device for pumping heat in a direction indicated by arrows 511. The cascade 510 is formed of a layer sequence of magnetocaloric material layers 512 to 522. In particular, the cascade has a cold-side outer layer 512 followed by a plurality of magnetocaloric inner layers, of which only the inner layers 514 to 520 are shown in the present example for reasons of graphical simplicity. Furthermore, the cascade 510 has a hot-side outer layer 522. The cold-side outer layer 512 exhibits a larger ratio $m\Delta S_{max}/\Delta T_C$ in comparison with any of the inner layers 512 to 520. This is schematically shown in a diagram on the right side of the cascade 510, illustrating a dependence of the ratio $m\Delta S_{max}/\Delta T_C$ on a position along the layer sequence of the cascade 510. This diagram shows that the cold-side outer layer 512 has the highest amount of $m\Delta S_{max}/\Delta T_C$ and that the hot-side outer layer 522 has the second-highest amount of $m\Delta S_{max}/\Delta T_C$.

In another embodiment similar to that of FIG. 5 (not shown), the amount of $m\Delta S_{max}/\Delta T_C$ is equal at the hot-side and cold-side outer layers 512 and 522.

In yet another embodiment similar to that of FIG. 5 (not shown), the amount of $m\Delta S_{max}/\Delta T_C$ of the hot-side outer layer 522 is equal to that of the inner layers 514 to 520.

In a further embodiment similar to that of FIG. 5 (not shown), the cold-side outer layer 512 has an amount of $m\Delta S_{max}/\Delta T_C$ equal to or larger than that of the inner layers 514 to 520, but the hot-side outer layer has a the highest amount of $\Delta S_{max}/\Delta T_C$ within the cascade.

Figure 6:
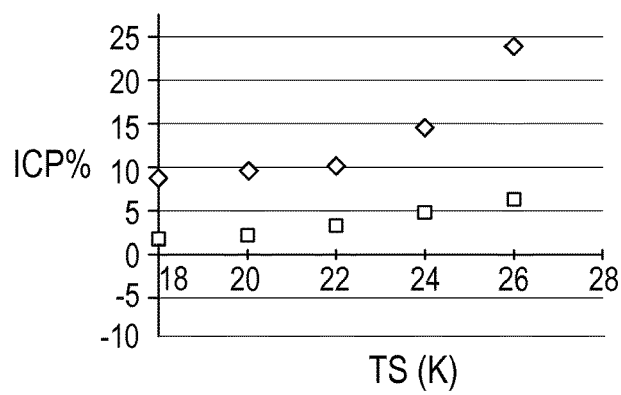
FIGS. 6 to 8 show diagrams illustrating an improvement in cooling power of different embodiments of the magnetocaloric cascade for different temperature spans between a hot-side temperature and a cold-side temperature, for three different hot-side temperatures.
Figure 7:
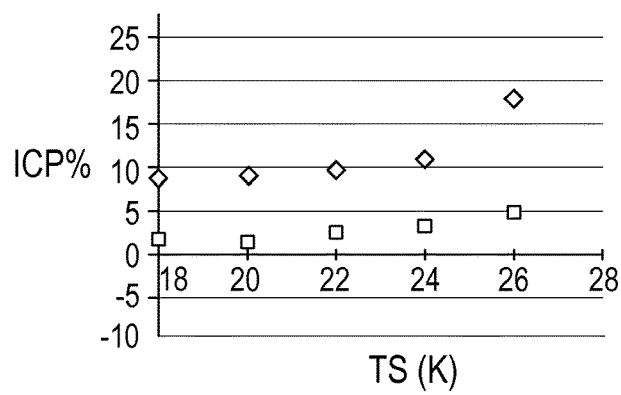
Figure 8:
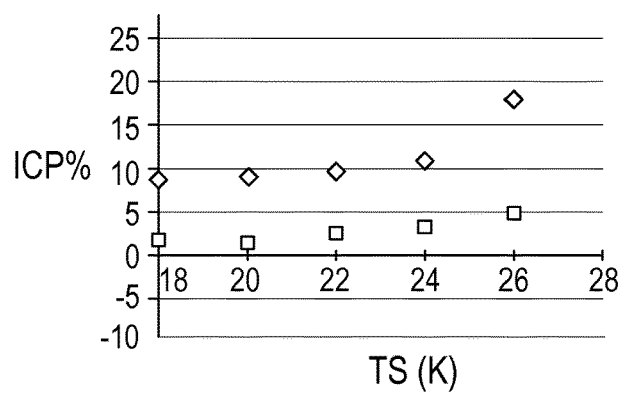

In the following, further embodiments of cascades will be discussed with reference to FIGS. 6 to 8. FIGS. 6 to 8 show diagrams illustrating an improvement in cooling power (abbreviated as ICP) of different embodiments of the magnetocaloric cascade for different temperature spans between a hot-side temperature and a cold-side temperature, for three different hot-side temperatures. The improvement is provided as a ratio in comparison with a reference cascade.

Virtual experiments were carried out using a physical model similar to that described by Engelbrecht: "A Numerical Model of an Active Magnetic Regenerator Refrigeration System", http://digital.library.wisc.edu/1793/7596). A one-dimensional model was employed. The magnetocaloric material layers of the cascade of all examples underlying the diagrams of FIGS. 8 to 10 had the same material properties, but shifted values of their Curie temperatures. For all experiments shown, the lowest Curie temperature was 15.7° C., and the highest Curie temperature at the hot-side outer layer was 33.7° C., resulting in an overall span in Curie temperature of 18 K across the cascades. The mass of magnetocaloric material was 0.025 kg; the pumped volume per blow was $2\times10^{-6}$ m$^3$.

EXAMPLE 1

Reduced $\Delta T_C$

A cooling power was determined for a reference cascade that is not in accordance with present invention and used for comparison only. The reference cascade has the following properties. It comprises a sequence of seven magnetocaloric layers, exhibiting equally spaced Curie temperatures with 3 K spacing. Curie Temperatures (in units of ° C.) were the following: 15.7 (cold-side outer layer); 18.7; 21.7; 24.7; 27.7; 30.7; 33.7 (hot-side outer layer). The layers had the same reference mass of 0.025 kg per layer, and a pumped volume per blow of $2\times10^{-6}$ m$^3$.

The cooling power was determined for the reference cascade and for different embodiments of the cascades of the present invention as explained in the following examples 1 and 2.

A first embodiment is a magnetocaloric cascade, which also has a layer sequence of seven magnetocaloric layers and the same mass per layer as the reference cascade and thus the same overall mass of the cascade in comparison to the reference cascade. However, the materials of the next neighboring inner layers of the hot-side outer layer and of the cold-side outer layer are chosen to have a smaller amount of Curie temperature difference $\Delta T_C$ to the hot-side and cold-side outer layer, respectively. For both the hot-side and the cold side outer layer, the Curie temperature difference $\Delta T_C$ with respect to its next neighboring inner layer amounts to 2.6 K. All inner layers have a Curie temperature difference of 3.2 K to their respective next neighboring inner layer. The absolute values of the Curie Temperatures (in units of ° C.) of the magnetocaloric layers of the cascade are the following: 15.7 (cold-side outer layer); 18.3; 21.5; 24.7; 27.9; 31.1; 33.7 (hot-side outer layer). Only results for spans above 18 K, which is the overall span in Curie temperatures are relevant and presented in the following.

EXAMPLE 2

Increased Mass

The same reference cascade as for Example 1 was used.

A second embodiment is a magnetocaloric cascade, which also has a layer sequence of seven magnetocaloric layers as the reference cascade. However, the cascade of the second embodiment has variations in the mass in comparison with the reference cascade, as will be described below. The overall mass of the cascade in comparison to the reference cascade is maintained the same. However, the hot-side outer layer and the cold-side outer layer have an identical mass that is higher than the mass of the individual inner layers of the cascade by 20%. Thus, the overall mass of the inner layers taken together is reduced by 20%. The inner layers have identical masses in comparison with each other.

Other than in the first embodiment, the materials of the next neighboring inner layers of the hot-side outer layer and of the cold-side outer layer are chosen to have the same Curie temperature difference $\Delta T_C$ to the hot-side and cold-side outer layer, i.e., the same Curie temperature difference $\Delta T_C$ to the hot-side and cold-side outer layer, respectively, as to the respective next neighboring inner layers, namely 3.0 K. The absolute values of the Curie Temperatures (in units of ° C.) of the magnetocaloric layers of the cascade are the following: 15.7 (cold-side outer layer); 18.7; 21.7; 24.7; 27.7; 30.7; 33.7 (hot-side outer layer).

FIG. 6 shows an improvement of the cooling power (ICP) in units of percent in relation to the cooling power of the reference cascade described above for an operating temperature at the hot-side interface of the cascade of 34.7° C. for different temperature spans TS in units of ° C., i.e., different operating temperatures at the cold-side interface of the cascade, in the range of temperatures spans TS between 18° C. and 28° C. Different symbols used represent different embodiments: the IPC values obtained for the first embodiment (reduced $\Delta T_C$) are represented by full squares, and the IPC values obtained for the second embodiment (increased mass) are represented by full diamonds. FIGS. 7 and 8 show corresponding diagrams, wherein the data obtained are based on an operating temperature at the hot-side interface of the cascade of 35.7° C. (FIG. 7) and 36.7° C. (FIG. 8) for the same temperature spans TS as in FIG. 6. Thus, FIGS. 6 to 8 provide data on cooling power obtained for operation on the hot side of 1 K (FIG. 6), 2 K (FIG. 7), and 3 K (FIG. 8) above the highest Curie temperature of the respective cascade.

The diagrams of FIG. 6 to FIG. 8 clearly show a significant improvement in cooling power of the magnetocaloric cascade of both embodiments in comparison with the reference cascade in the full range of temperature spans TS between 18 and 26 K. The improvement is higher for the second embodiment. The improvement clearly increases with increasing temperature span. The improvement is almost the same for all three operating temperatures at the hot side.

The results are similar for cascades where the two outer layers (or even more) at one or both sides are modified using a higher mass per layer or a smaller Curie temperature spacing).

Figure 9:
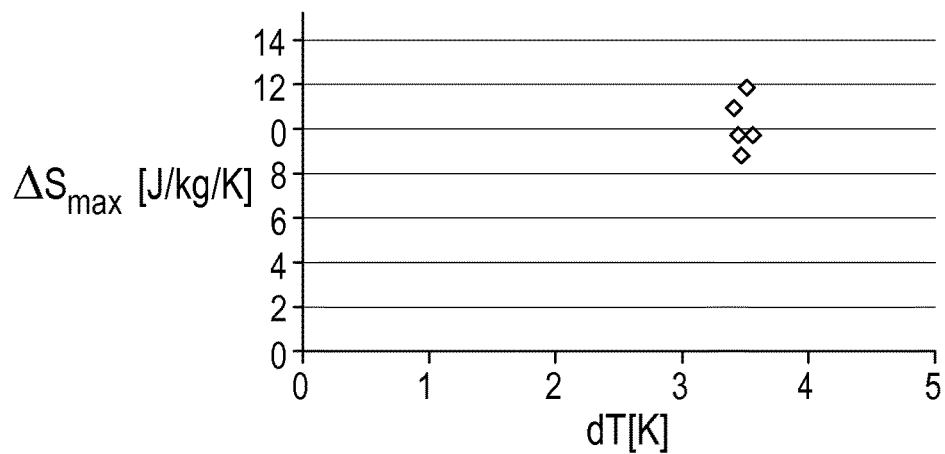
FIG. 9 shows a diagram illustrating the maximum isothermal magnetic entropy change $\Delta S_{max}$ in a magnetic phase transition of different magnetocaloric materials as a function of a maximum adiabatic temperature change in an applied magnetic field of 1.5 T.

FIG. 9 shows a diagram illustrating the maximum isothermal magnetic entropy change $\Delta S_{max}$ in a magnetic phase transition of five different magnetocaloric materials plotted over their adiabatic temperature change $\Delta T_{ad}$ at the temperature, at which $\Delta S_{max}$ occurs, in an applied magnetic field of 1.5 T, suitable for causing a magnetocaloric effect in the five different materials. The materials are selected from the material system MnFe(P,As)Si. The diagram demonstrates that the mere selection of a different material results in a change of $\Delta S_{max}$, while the adiabatic temperature change $\Delta T_{ad}$ can be kept substantially unchanged. The entropy span available for the five exemplary materials shown at a magnetic field of 1.5 T covers a range of more than 3 J/kg/K between 8.8 J/kg/K and about 11.9 J/kg/K, whereas the adiabatic temperature change $\Delta T_{ad}$ is substantially identical at about 3.5 K. Thus, there is considerable flexibility in the adaptation of the entropy parameter m$\Delta$S by variation of the parameter $\Delta$Smax in designing a layer sequence for a magnetocaloric cascade. With the parameter $\Delta$Smax, the linewidth of the temperature dependence of m$\Delta$S is changed at the same time, thus also allowing an adaptation of the crossing-point values.

EXAMPLE 3

A cooling power was determined for a second reference cascade that is not in accordance with present invention and used for comparison only. The reference cascade has the following properties. It comprises a sequence of seven magnetocaloric layers, exhibiting equally spaced Curie temperatures with 3 K spacing. Curie Temperatures (in units of ° C.) were the following: 15.7 (cold-side outer layer); 18.7; 21.7; 24.7; 27.7; 30.7; 33.7 (hot-side outer layer). The layers had the same reference mass of 0.025 kg per layer, and a pumped volume per blow of $2 \times 10^{-6}$ m$^3$. The flow rate can be optimized for a given application case by known means. The second reference cascade differs from the reference cascade described above in the context of the Example 1 in the material of the magnetocaloric layers of the cascade, thus giving rise to a different lineshape of $\Delta$S as a function of temperature, and to a different $\Delta S_{max}$. The material of all layers of the second reference is identical and has a $\Delta S_{max}$ of 8.85 J/kg/K.

The cooling power was determined for the reference cascade and for different embodiments of the cascades of the present invention as explained in the following examples 3 and 4.

The cascade of Example 3 differs from the reference cascade only in that the material of the hot-side outer layer and the cold-side outer layer has a different maximum isothermal magnetic entropy change $\Delta S_{max}$ than the material of the hot-side outer layer and the cold-side outer layer of the reference cascade. The amount of $\Delta S_{max}$ of the hot-side outer layer and the cold-side outer layer of the reference cascade is 10.97 J/kg/K.

FIG. 10 shows a diagram illustrating an improvement in cooling power of the embodiment of the magnetocaloric cascade of Example 3 for different temperature spans between a hot-side temperature and a cold-side temperature, for three different hot-side temperatures. As before, the data obtained are based on an operating temperature at the hot-side interface of the cascade of 34.7° C. (filled diamonds), 35.7° C. (crosses), and 36.7° C. (filled triangles). The improvement in cooling power ICP is given as a percentage over the second reference cascade. An improvement in cooling power (ICP) of up to 40% is achieved with the structure of Example 3 at all three operating temperatures. Similar results are achieved for the other exemplary materials represented in FIG. 9.

EXAMPLE 4

The same second reference cascade as for Example 3 was used.

The cascade of Example 4 differs from the reference cascade in that the hot-side outer layer and the cold-side outer layer both have a mass that is different from the hot-side outer layer and the cold-side outer layer of the reference cascade. The mass is increased in comparison with the hot-side outer layer and the cold-side outer layer of the reference cascade by 20%. Furthermore, the mass of the inner layers is reduced in mutually identical amounts so as to maintain the same overall mass of the cascade of Example 4 as that of the second reference cascade.

FIG. 11 shows a diagram illustrating an improvement in cooling power of the embodiment of the magnetocaloric cascade of Example 4 for different temperature spans between a hot-side temperature and a cold-side temperature, for three different hot-side temperatures. As before, the data obtained are based on an operating temperature at the hot-side interface of the cascade of 34.7° C. (filled diamonds), 35.7° C. (crosses), and 36.7° C. (filled triangles). The improvement in cooling power ICP is given as a percentage over the second reference cascade. An improvement in cooling power (ICP) of up to 5% is achieved with the structure of Example 4 at all three operating temperatures.

EXAMPLE 5

The same second reference cascade as for Example 3 was used.

The cascade of Example 5 differs from the reference cascade in that the cold-side outer layer has a Curie temperature spacing to its next neighboring inner layer that is smaller than the corresponding Curie temperature spacing of the reference cascade. The other Curie temperatures across the cascade of Example 5 are increased in comparison with those of the reference cascade. The Curie temperature spacings in units of K across the cascade are as follows: 3.08 (hot side)/3.08/3.08/3.08/2.6 (cold side).

FIG. 12 shows a diagram illustrating an improvement in cooling power of the embodiment of the magnetocaloric cascade of Example 5 for different temperature spans between a hot-side temperature and a cold-side temperature, for three different hot-side temperatures. As before, the data obtained are based on an operating temperature at the hot-side interface of the cascade of 34.7° C. (filled diamonds), 35.7° C. (crosses), and 36.7° C. (filled triangles). The improvement in cooling power ICP is given as a percentage over the second reference cascade. An improvement in cooling power (ICP) of between 2 and 3% is achieved with the structure of Example 5 at all three operating temperatures.

The invention claimed is:

1. A magnetocaloric cascade, comprising:
a sequence of magnetocaloric material layers having different Curie temperatures $T_C$,
wherein the magnetocaloric material layers include a cold-side outer layer, a hot-side outer layer and at least three inner layers between the cold-side outer layer and the hot-side outer layer, and each pair of next neighboring magnetocaloric layers of the magnetocaloric cascade has a respective Curie-temperature difference amount $\Delta T_C$ between their respective Curie temperatures, and
wherein the hot-side outer layer or the cold-side outer layer or both the hot-side and cold-side outer layer exhibits a larger ratio $m\Delta S_{max}/\Delta T_C$ in comparison with any of the inner layers, m denoting the mass of the respective magnetocaloric material layer and $\Delta S_{max}$ denoting a maximum amount of isothermal magnetic entropy change achievable in a magnetic phase transition of the respective magnetocaloric material layer.

2. The magnetocaloric cascade of claim 1, wherein the hot-side outer layer or the cold-side outer layer exhibits an amount of the ratio $m\Delta S_{max}/\Delta T_C$ that is at least 1% larger in comparison with any of the inner layers.

3. The magnetocaloric cascade of claim 1, wherein one of the hot-side and cold-side outer layers has a higher amount of the ratio $m\Delta S_{max}/\Delta T_C$ than the other, and wherein the other of the hot-side and cold-side outer layers has a higher amount of the ratio $m\Delta S_{max}/\Delta T_C$ than any of inner layers.

4. The magnetocaloric cascade of claim 1, wherein the hot-side outer layer or the cold-side outer layer exhibits an amount of a product $m\Delta S_{max}$ of its mass and $\Delta S_{max}$, the amount of $m\Delta S_{max}$ being larger by at least 10% in comparison with any of the inner layers.

5. The magnetocaloric cascade of claim 1, wherein the hot-side layer or the cold-side layer exhibits a smaller amount of $\Delta T_C$ in comparison with any of the inner layers.

6. The magnetocaloric cascade of claim 5, wherein the hot-side layer or the cold-side layer exhibits an amount of $\Delta T_C$ that is no less than 0.5 K.

7. The magnetocaloric cascade of claim claim 1, wherein the hot-side outer layer or the cold-side outer layer or both the hot-side and cold-side outer layer comprises a sublayer sequence of at least two hot-side sublayers or cold-side sublayers, respectively.

8. The magnetocaloric cascade of claim 1, wherein for each pair of next neighboring magnetocaloric material layers of the magnetocaloric cascade there exists a respective crossing temperature, at which an entropy parameter $m\Delta S$ of both respective neighboring magnetocaloric material layers assumes the same crossing-point value, the entropy parameter $m\Delta S$ being defined as a product of the mass m of the respective magnetocaloric material layer and an amount of its isothermal magnetic entropy change $\Delta S$ in a magnetic phase transition of the respective magnetocaloric material layer; and wherein
all crossing-point values of an entropy parameter $m\Delta S$ of all pairs of next neighboring inner layers are equal, either exactly or within a margin of ±15%, to a mean value of all crossing-point values of all pairs of next neighboring inner layers of the magnetocaloric cascade.

9. The magnetocaloric cascade of claim 8, wherein different inner layers exhibit respective materials and respective masses which in combination provide the respective crossing-point values of the entropy parameter $m\Delta S$ at no less than 70% of a global maximum of the entropy parameter $m\Delta S$ assumed in any of the inner layers across the magnetocaloric cascade.

10. A magnetocaloric regenerator, comprising:
the magnetocaloric cascade according to claims 1.

11. A heat pump, comprising: a magnetocaloric regenerator according to claim 10.

12. The heat pump of claim 11, further comprising:
a hot-side interface in thermal communication with the hot-side outer layer,
a cold-side interface in thermal communication with the cold-side outer layer, and
a heat transfer system, which is configured to provide a flow of a heat-transfer fluid between the hot-side interface and the cold side interface through the magnetocaloric cascade,
wherein the Curie temperature of the hot-side outer layer is selected to be higher than a temperature of the hot-side interface in operation of the heat pump, or the Curie temperature of the cold-side outer layer is selected to be lower than a temperature of the cold-side interface in operation of the heat pump.

13. A method for fabricating a magnetocaloric cascade, comprising:

fabricating a sequence of different magnetocaloric material layers having different Curie temperatures $T_C$, wherein the magnetocaloric material layers include a cold-side outer layer, a hot-side outer layer and at least three inner layers between the cold-side outer layer and the hot-side outer layer and each pair of next neighboring magnetocaloric layers of the magnetocaloric cascade has a respective Curie-temperature difference amount $\Delta T_C$ between their respective Curie temperatures, wherein the hot-side outer layer or the cold-side outer layer or both the hot-side and cold-side outer layer are fabricated so as to exhibit a larger ratio $m\Delta S_{max}/\Delta T_C$ in comparison with any of the inner layers, m denoting the mass of the respective magnetocaloric material layer and $\Delta S_{max}$ denoting a maximum amount of isothermal magnetic entropy change achievable in a magnetic phase transition of the respective magnetocaloric material layer.

14. A heat-pumping method, comprising:

performing a heat-pumping sequence using a magnetocaloric regenerator comprising a magnetocaloric cascade according to claim 1.

15. The heat-pumping method of claim 14, wherein the heat-pumping sequence includes a temperature increase of the magnetocaloric regenerator and—the heat-pumping sequence is performed in thermal communication with a heat sink, which is operated at a temperature that is between 0.5 K and 5 K higher than a Curie temperature of the hot-side outer layer.

* * * * *

UNITED STATES PATENT AND TRADEMARK OFFICE
CERTIFICATE OF CORRECTION

PATENT NO. : 10,229,775 B2
APPLICATION NO. : 15/535621
DATED : March 12, 2019
INVENTOR(S) : Florian Scharf et al.

Page 1 of 1

It is certified that error appears in the above-identified patent and that said Letters Patent is hereby corrected as shown below:

In the Specification

Column 3, Line 37, "$\Delta S_{max}$" should read -- $\Delta S_{max}.$" --;

Column 11, Line 26, "Selecting a the" should read -- Selecting the --;

Column 12, Line 1, "has a the highest" should read -- has the highest --;

Column 14, Line 7, "$\Delta Smax$" should read -- $\Delta S_{max}$ --;

Column 14, Line 8, "$\Delta Smax$," should read -- $\Delta S_{max},$ --; and

In the Claims

Column 16, Line 21, Claim 7, "claim claim 1," should read -- claim 1, --.

Signed and Sealed this
Twenty-first Day of April, 2020

Andrei Iancu
*Director of the United States Patent and Trademark Office*